(12) United States Patent
Graceffo et al.

(10) Patent No.: US 10,250,292 B2
(45) Date of Patent: Apr. 2, 2019

(54) OPTICAL RAKE RECEIVER USING AN ETALON DETECTOR

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/018,159

(22) Filed: Jun. 26, 2018

(65) Prior Publication Data
US 2019/0007091 A1 Jan. 3, 2019

Related U.S. Application Data

(60) Provisional application No. 62/527,113, filed on Jun. 30, 2017.

(51) Int. Cl.
| | | |
|---|---|---|
| *H04B 1/7115* | (2018.01) | |
| *H04B 10/54* | (2013.01) | |
| *H04B 10/69* | (2013.01) | |
| *H04B 10/40* | (2013.01) | |
| *H04B 10/67* | (2013.01) | |
| *H04B 10/50* | (2013.01) | |

(52) U.S. Cl.
CPC ........... *H04B 1/7115* (2013.01); *H04B 10/40* (2013.01); *H04B 10/505* (2013.01); *H04B 10/54* (2013.01); *H04B 10/671* (2013.01); *H04B 10/69* (2013.01)

(58) Field of Classification Search
CPC .... H04B 1/7115; H04B 10/40; H04B 10/505; H04B 10/54; H04B 10/671; H04B 10/69

USPC ........................................................ 398/186
See application file for complete search history.

(56) References Cited

U.S. PATENT DOCUMENTS

| | | | |
|---|---|---|---|
| 5,371,623 A | 12/1994 | Eastmond et al. | |
| 5,684,793 A | 11/1997 | Kiema et al. | |
| 6,240,109 B1 * | 5/2001 | Shieh ................... | H01S 5/0687 372/18 |

(Continued)

FOREIGN PATENT DOCUMENTS

| | | |
|---|---|---|
| JP | H0591047 A | 4/1993 |
| WO | 0195534 A2 | 12/2001 |
| WO | 2016170466 A1 | 10/2016 |

OTHER PUBLICATIONS

International Search Report and Written Opinion in application No. PCT/US2018/039389 dated Sep. 27, 2018.
Zhang, L. et al. "Microring-based Modulation and Demodulation of DPSK Signal" Optical Society of America, Optics Express, vol. 15, No. 18, Sep. 3, 2007.
Arimoto et al., "High-speed free-space laser communication", Performance and Management of Complex Communications Networks, 1998, pp. 175-190.

(Continued)

*Primary Examiner* — Dalzid E Singh
(74) *Attorney, Agent, or Firm* — Lando & Anastasi, LLP (57) ABSTRACT

An optical receiver and communication method receives an optical signal by an optical resonator to provide an intensity modulated signal indicative of a modulation of the optical signal. The intensity modulated signal is provided to a channel receiver of a plurality of channel receivers, and the channel receiver recovers from the intensity modulated signal a multipath version of a transmitted signal embedded in the modulation of the optical signal. The channel receiver's output is combined with an output of at least one other of the plurality of channel receivers to provide a combined output signal.

20 Claims, 6 Drawing Sheets

(56) References Cited

U.S. PATENT DOCUMENTS

| | | | |
|---|---|---|---|
| 8,411,351 B2 | 4/2013 | McCallion et al. | |
| 2005/0026578 A1* | 2/2005 | Kelley | H04B 1/71052 455/132 |
| 2006/0013591 A1 | 1/2006 | Rohde | |
| 2006/0104321 A1* | 5/2006 | He | H01S 5/0265 372/26 |
| 2006/0200553 A1* | 9/2006 | Xu | H04B 1/7115 709/224 |
| 2007/0031150 A1 | 2/2007 | Fisher et al. | |
| 2008/0226300 A1 | 9/2008 | Mayer et al. | |
| 2008/0240736 A1 | 10/2008 | Ji et al. | |
| 2008/0266573 A1 | 10/2008 | Choi et al. | |
| 2011/0097085 A1 | 4/2011 | Oda et al. | |
| 2012/0121271 A1* | 5/2012 | Wood | |
| 2013/0148982 A1* | 6/2013 | Barton | H04B 10/505 398/185 |
| 2013/0272337 A1 | 10/2013 | Tan et al. | |
| 2014/0314406 A1 | 10/2014 | Zerbe et al. | |
| 2015/0316382 A1* | 11/2015 | Sanders | G01C 19/721 356/461 |
| 2016/0013870 A1 | 1/2016 | Sorin et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

International Search Report and Written Opinion for application No. PCT/US2017/053667 dated Dec. 15, 2017.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

\* cited by examiner

OPTICAL RAKE RECEIVER USING AN ETALON DETECTOR

CROSS-REFERENCE TO RELATED APPLICATIONS

This application claims the benefit under 35 U.S.C. § 119(e) of U.S. Provisional Patent Application No. 62/527,113 titled OPTICAL RAKE RECEIVER USING AN ETALON DETECTOR, filed on Jun. 30, 2017, which is hereby incorporated by reference in its entirety for all purposes.

BACKGROUND

Transmissions (e.g., optical or radio-frequency waveforms) used in traditional free-space communications experience various reflections, for example due to physical structures or atmospheric variations, and cause multiple versions of the waveform to arrive at a receiver with varying time delays. If a line-of-sight path exists between the transmitter and the receiver, the direct line-of-sight signal will be the first to arrive at the receiver and will tend to be the strongest signal received, though such may not always be the case. Any of the delayed versions may be the strongest signal, depending upon conditions. "Multipath" is a general term for the phenomenon of multiple versions of the transmitted signal related to the multiple paths between the transmitter and the receiver. The reception of multipath signals may cause signal fading in traditional receivers. Rake receivers, however, process received signals in a manner to exploit the additional delayed versions of the most direct signal.

Conventional rake receivers for optical communications tend to be complex, requiring extensive processing in the optical domain, such as to accommodate differing polarization of the various multipath signals, and accordingly include significant optical components that have substantial spatial and alignment requirements and limit flexibility.

SUMMARY

Aspects and embodiments are generally directed to systems and methods for receiving and processing multiple versions of an optical transmission signal to re-combine them in proper phase and intensity using multiple parallel receiver channels (termed "fingers") of a rake receiver using optically resonant front-end detector(s), such as a Fabry-Perot etalon, for phase and intensity detection. In particular, examples of the systems and methods described herein use one or more etalons to receive optical signals and convert modulations (e.g., of phase, frequency, amplitude) of the received optical signals into intensity modulations of an output optical signal, and provide the intensity modulated output optical signal to various channel receivers of a rake receiver.

According to an aspect, an optical communication method is provided and includes receiving an optical signal by an optical resonator to provide an intensity modulated signal indicative of a modulation of the optical signal, providing the intensity modulated signal to a selected channel receiver of a plurality of channel receivers, recovering, by the selected channel receiver, from the intensity modulated signal, a multipath version of a transmitted signal embedded in the modulation of the optical signal, to provide a recovered signal, and combining the recovered signal with an output of at least one other of the plurality of channel receivers to provide a combined output signal.

Some embodiments include providing the intensity modulated signal to a second channel receiver of the plurality of channel receivers, recovering, by the second channel receiver, from the intensity modulated signal, a second multipath version of the transmitted signal to provide a second recovered signal, and combining the recovered signal from the selected channel receiver with the second recovered signal to provide the combined output signal.

Some embodiments include receiving a second optical signal by a second optical resonator to provide a second intensity modulated signal indicative of a modulation of the second optical signal, providing the second intensity modulated signal to a second channel receiver of the plurality of channel receivers, recovering, by the second channel receiver, from the second intensity modulated signal, a second multipath version of the transmitted signal to provide a second recovered signal, and combining the recovered signal from the selected channel receiver with the second recovered signal to provide the combined output signal.

According to certain embodiments, recovering a multipath version of a transmitted signal includes correlating an intensity modulated signal to a time delayed version of a transmitted code embedded in the optical signal from which the intensity modulated signal is provided.

Various embodiments include receiving the optical signal by a second optical resonator to provide a second intensity modulated signal indicative of a direction of a phase shift in the optical signal, and providing the second intensity modulated signal to the selected channel receiver.

Certain embodiments include providing the intensity modulated signal to a filter and determining, by the filter, an appropriate time delay for recovering the multipath version of the transmitted signal. Some embodiments may include controlling the selected channel receiver to apply the appropriate time delay.

According to some embodiments, receiving an optical signal by an optical resonator includes receiving the optical signal by one of an etalon, a resonant cavity, an interferometer, and a micro-ring.

According to another aspect, an optical receiver is provided. The optical receiver includes at least one optical resonator configured to receive an optical signal and to provide an intensity modulated signal indicative of a modulation of the optical signal, a plurality of channel receivers, each of the plurality of channel receivers configured to recover from an input signal a multipath version of a transmitted signal embedded in the modulation of the optical signal, at least one of the plurality of channel receivers configured to receive the intensity modulated signal as its input signal and to provide a recovered output signal, and a combiner configured to combine the recovered output signal with at least one other output signal from at least one other of the plurality of channel receivers to provide a combined output signal.

According to some embodiments, a second of the plurality of channel receivers is configured to receive the intensity modulated signal, to recover from the intensity modulated signal a different multipath version of the transmitted signal, and to provide the at least one other output signal.

Certain embodiments include a second optical resonator to receive a second optical signal and to provide a second intensity modulated signal indicative of a modulation of the second optical signal, the second intensity modulated signal provided as an input signal to a second of the plurality of channel receivers. The second channel receiver may be configured to receive the second intensity modulated signal, to recover from the second intensity modulated signal a different multipath version of the transmitted signal, and to provide the at least one other output signal.

Some embodiments include a second optical receiver configured to receive the optical signal and provide a second intensity modulated signal indicative of a direction of a phase shift in the optical signal, and to provide the second intensity modulated signal to the selected channel receiver. The selected channel receiver may be configured to interpret the second intensity modulated signal to recover the multipath version of the transmitted signal.

In certain embodiments, a channel receiver may be configured to recover a multipath version of a transmitted signal by correlating its input signal to a time delayed version of a transmitted code embedded in the optical signal from which its input signal was provided.

Certain embodiments include a filter to receive the intensity modulated signal and configured to determine an appropriate time delay for recovering the multipath version of the transmitted signal. Some embodiments also include a controller configured to control the selected channel receiver to apply the appropriate time delay.

In certain embodiments, the at least one optical resonator is one of an etalon, a resonant cavity, an interferometer, and a micro-ring.

According to yet another aspect, an optical receiver is provided that includes means for converting a received optical signal into an intensity modulated signal indicative of a modulation of the optical signal, and a signal processor having a plurality of channels, at least one of the plurality of channels configured to recover from the intensity modulated signal a multipath version of a transmitted signal embedded in the optical signal, and the signal processor configured to combine the outputs of two or more of the plurality of channels to provide a combined output signal.

According to some embodiments, the means for converting the received optical signal includes one of an etalon, a resonant cavity, an interferometer, and a micro-ring.

According to certain embodiment, each of the plurality of channels is configured to correlate the intensity modulated signal to a time delayed version of a transmitted code embedded in the multipath version of the transmitted signal.

Some embodiments include means for converting the received optical signal into a second intensity modulated signal indicative of a direction of a phase shift in the optical signal, and at least one of the plurality of channels is configured to interpret the second intensity modulated signal to recover the multipath version of the transmitted signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and examples described herein are generally directed to optically resonant components coupled with a rake receiver to take advantage of the reception of multiple versions of an optical signal. Including one or more optically resonant components allows reduced optical processing and allows reception of the signals without requiring a coherent detector. Transients in an optical signal, such as the data-carrying amplitude, phase, or frequency variations placed in the signal by a transmitter, are converted to intensity variations at the output of the resonant component and are easily converted to an electrical form and provided to various channels of a rake receiver.

It is to be appreciated that examples and/or embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more examples and embodiments are not intended to be excluded from a similar role in any other example or embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

The accompanying drawings are included to provide illustration and a further understanding of the various aspects and examples, and are incorporated in and constitute a part of this disclosure. The drawings, together with the remainder of the disclosure, serve to explain principles and operations of the described and claimed aspects and examples.

Many optical communication receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. Conventional rake receivers for optical communications have all the same requirements, potentially multiplied many times over, as each receiver channel (finger) of the rake receiver is essentially an independent receiver in its own right. In contrast, optical rake receivers in accord with the aspects and examples disclosed herein do not require a local coherent clock source nor significant optical components to achieve the same receiver capabilities as a conventional optical rake receiver. The benefits are achieved, at least in part, by an optical front-end that includes an optical resonator capable of detecting modulation transitions, such as phase changes, in an optical signal without a coherent reference source. The optical front-end further transforms the modulation, e.g., phase modulation, into an intensity modulation that allows simplified processing, potentially in the electrical domain.

Figure 1:
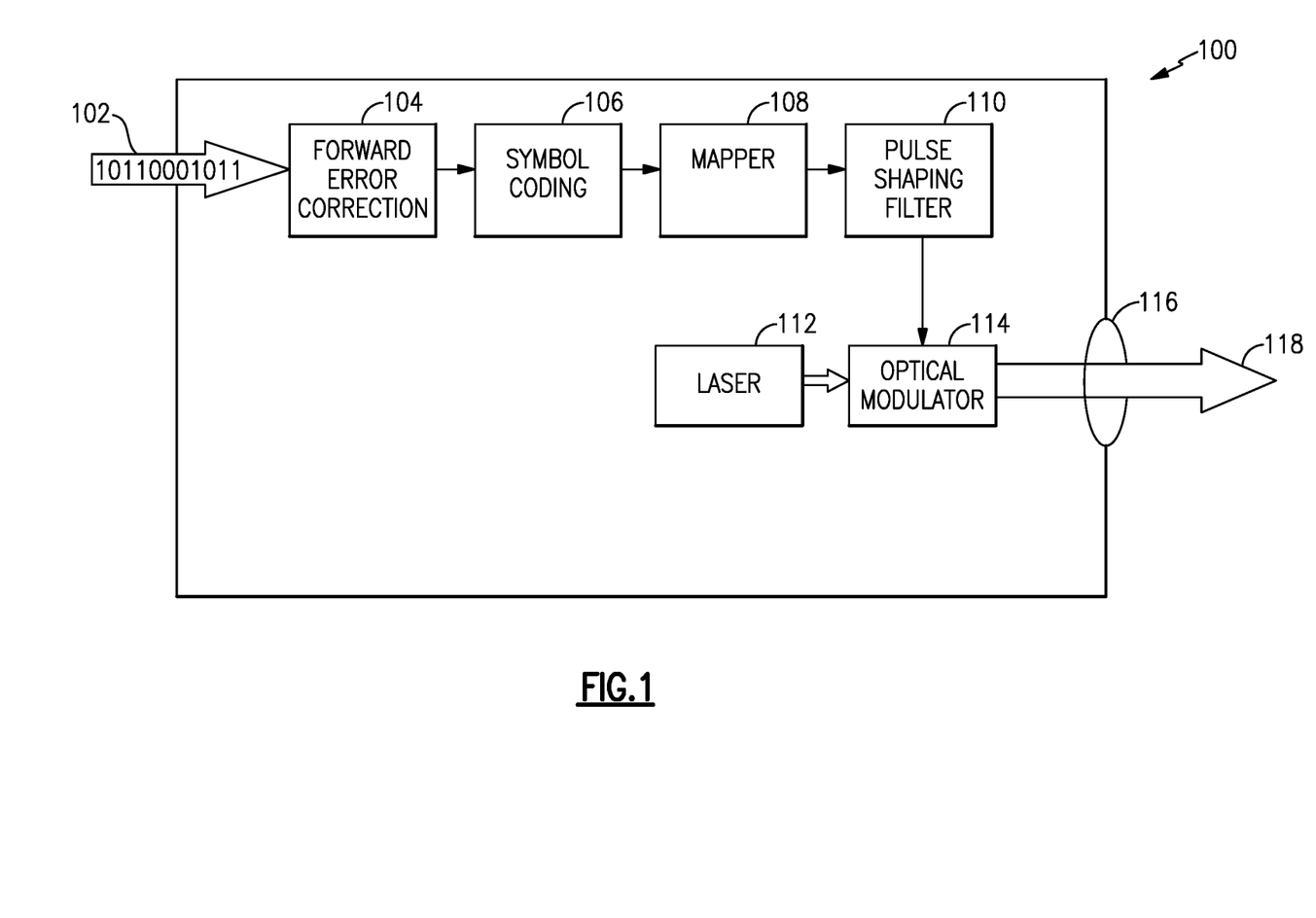
FIG. 1 is a functional block diagram of a notional optical transmitter for use with various examples described herein.
Figure 2A:
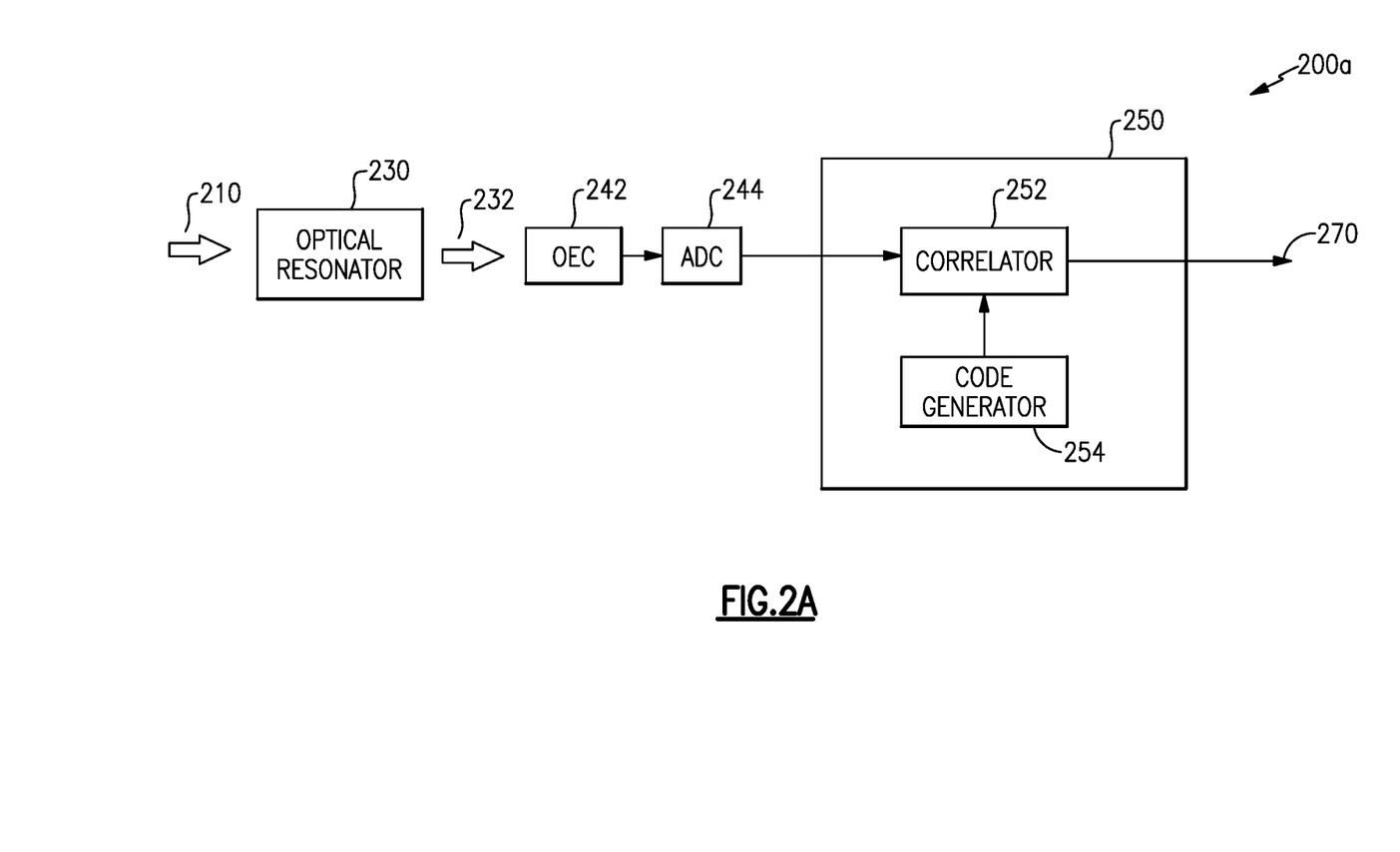
FIG. 2A is a functional block diagram of an optical receiver that may be part of an optical rake receiver according to various examples described herein.
Figure 2B:
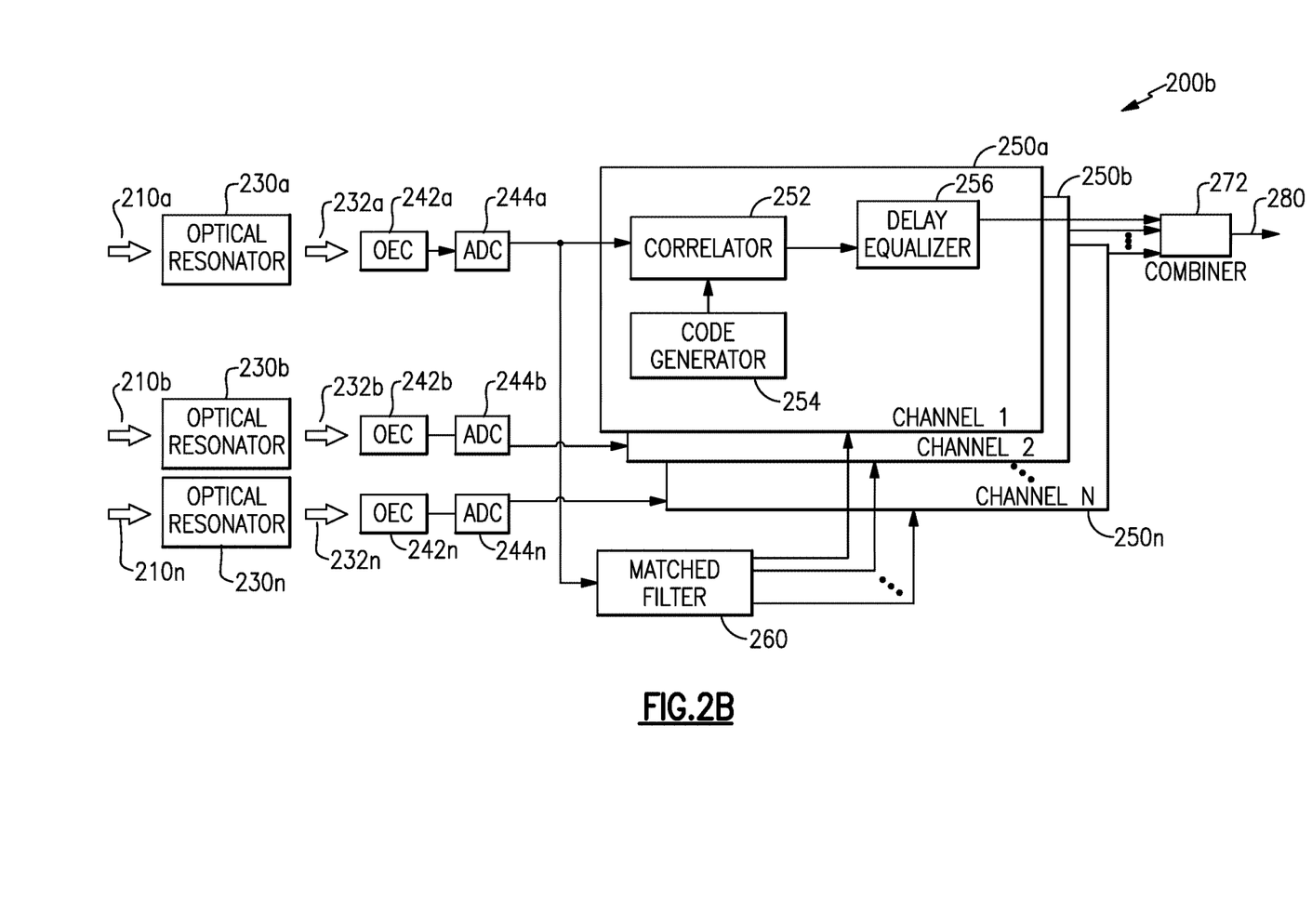
FIG. 2B is a functional block diagram of an optical rake receiver according to various examples described herein.

A functional block diagram of one example of a transmitter (e.g., optical transmitter 100) is illustrated in FIG. 1, and a functional block diagram for each of two examples of a receiver is illustrated in FIGS. 2A and 2B (e.g., optical receiver 200a, 200b). The transmitter illustrated in FIG. 1 may be combined with either receiver illustrated in FIGS. 2A and 2B to provide one example of a communication assembly, as will be readily apparent to one of ordinary skill in the art given the benefit of this disclosure.

Though the components of the example optical transmitter 100 shown in FIG. 1 and the example optical receivers 200a, 200b shown in FIGS. 2A and 2B may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receivers 200a, 200b may be implemented as discrete analog, digital, or optical signal lines. Some of the processing operations may be expressed in terms of calculations or determinations by the optical transmitter 100, the optical receivers 200a, 200b, a controller, or other components. The equivalent of calculating and determining values, or other elements, can be performed by any suitable analog or digital signal processing techniques and are included within the scope of this disclosure. Such techniques are further discussed with reference to the controller 500 described below with reference to FIG. 5. Unless otherwise indicated, control signals may be encoded in either digital or analog form.

Referring to FIG. 1, one example of an optical transmitter 100 may include an input 102 to receive a data payload, a forward error correction (FEC) module 104, an encoding module 106, a mapping module 108, a pulse-shaping filter 110, an optical source (e.g., a laser) 112, a modulator 114, and optics 116, and an output 118 to provide an optical signal output.

The transmitter 100 may include a FEC module 104 that implements forward error correction by adding redundancy to the data with a block code or convolution code. For example, the FEC module 104 may repeat one or more bits within the data payload to reduce an effect that the free-space transmission medium may have on the transmitted signal waveform. Accordingly, in various examples the optical transmitter 100 may include a FEC module 104 to control errors that may result from transmitting the data payload through a noisy medium.

The transmitter 100 includes an encoding module 106 that applies to the data payload a symbol code, which is useful for identifying and processing the multipath components in the receiver, and also reduces the effects of inter-symbol interference (ISI). For example, the encoding module 106 may include a pseudo-random code generator (PRCG) or any other symbol coding techniques known in the art, while other examples of transmitters or coding modules may apply.

The mapping module 108 maps the data payload to a particular modulation scheme, such as various positions of a particular phase and amplitude constellation, depending upon the types of modulation used by the transmitter, e.g., phase, amplitude, frequency, or any combination of these.

A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include various optics 116, such as one or more mirrors or lenses, that direct the optical signal at the output 118.

Referring to FIG. 2A, illustrated is an optical receiver 200a which may be used as part of a multi-channel optical rake receiver according to various examples discussed herein. FIG. 2A is described with continuing reference to the optical transmitter 100 of FIG. 1, which may communicate data payloads to the optical receiver 200a. Additionally, a receiver and a transmitter may be paired together to form a transceiver capable of bidirectional data communication with another transmitter/receiver pair.

The illustrated receiver 200a receives an optical signal 210 and includes an optical resonator 230 and a digital processing subsystem 250 that provides an output 270. The optical resonator 230 may be coupled to the digital processing subsystem by an optical-electrical converter 242 and an analog to digital converter 244, for example.

The optical resonator 230 receives the optical signal 210. Examples of optical resonators 230 may include Fabry-Perot etalons, micro-rings, or other types of resonators. The optical resonator 230 is a component capable of sensing transitions, such as phase changes, representative of modulation performed at the transmitter, and transforming the transitions into intensity modulation of an output optical signal. The optical resonator 230 converts the modulation of the arriving optical signal 210 in part by interaction of the arriving optical signal 210 with resonant optical energy built-up in the optical resonator 230.

For example, an etalon is a component having a pair of parallel semi-reflective surfaces, that may include a transparent material in between, and has a characteristic resonant frequency associated with a certain wavelength of light based upon the spacing (i.e., dimension) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232a in FIG. 2A.

An optical signal received by an optical resonator 230, an etalon in this example, establishes a steady-state energy-conserving condition in which optical signal energy continuously arrives at the etalon, adds to the built-up resonating energy existing inside the etalon, and emerges from the etalon at a constant rate. If the frequency, amplitude, or phase of the arriving optical signal changes, the change causes a temporary disruption to the resonance inside the etalon and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase change in the arriving optical signal 210, for example, causes a large (but temporary) intensity change in the emerging optical signal 232. Similar operation occurs in a micro-ring or other optical resonator, and accordingly an optical resonator 230 functions as a demodulator, or a modulation converter, for an optical signal 210. The emerging optical signal 232 may therefore carry the same information content as the arriving optical signal 210, but in an intensity modulated form.

The emerging intensity-modulated optical signal 232 may be converted to an electrical signal by an optical-electrical converter, e.g., OEC 242, which may include a photodetector, such as a photodiode, for example. The output of the OEC 242 may be an amplitude modulated version of the intensity-modulated optical signal 232, which may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

Referring to FIG. 2B, illustrated is an optical rake receiver 200b, including multiple individual channel receivers, such as the receiver 200a, according to various examples discussed herein. FIG. 2B is described with continuing reference to the optical transmitter 100 of FIG. 1, which may communicate data payloads to the optical receiver 200b. Additionally, a receiver 200b and a transmitter 100 may be paired together to form a transceiver capable of bidirectional data communication with another transmitter/receiver pair.

The illustrated receiver 200b receives one or more optical signals 210 and includes an optical resonator 230 and a digital processing subsystem 250 for each channel receiver, and also includes a combiner 272 to provide a combined output 280.

One or more of the optical resonators 230 receives a multi-path version of the optical signal 210 and converts a phase modulation (or other modulations in various examples) of the arriving optical signal 210 into an intensity-modulated optical signal 232, as discussed above. Also as discussed above, the emerging intensity-modulated optical signal 232 may be converted to a digital form by an OEC 242 and an ADC 244. The digital signal of each channel receiver is provided to an associated digital processing subsystem 250 for digital processing.

Each digital processing subsystem 250 processes its respective digital signal to receive the information-carrying content from one of the multipath versions of the transmitted signal. As discussed above, the transmitted signal may experience multipath effects and arrive at the receiver 200b in multiple versions with varying differences in time delay. Accordingly, each digital processing subsystem 250 attempts to receive one of the multiple versions of the transmitted signal. In the receiver 200b of FIG. 2B, a matched filter 260 may be included that receives a digital version of the optical signal 210, e.g., as received by the optical resonator 230a. The output of the matched filer 260 is a set of delays that represent the time variations of the various multipath versions of the transmitted signal, and the matched filter 260 communicates to the individual digital processing subsystems 250 which delayed version of the signal each digital processing subsystem 250 should receive. In some examples, the matched filter 260 may receive signals from multiple of the optical resonators 230, because some multi-path versions of the optical signal 210 may be received by some but not others of the optical resonators 230. In some examples, the receiver may not include a matched filter 260. The individual digital processing subsystems 250 may, for example, find a particular multi-path version of the transmitted signal through correlation (e.g., by a correlator 252) with the symbol code word coded by the transmitter, as discussed above, and as locally generated by, e.g., the code generator 254.

In certain examples, each channel receiver includes a digital processing subsystem 250 that may include a correlator 252 that receives the digital version of the optical signal 210 received by its affiliated optical resonator 230. The correlator 252 also receives an encoded symbol (e.g., from the code generator 254) that matches the code generator used at the transmitter. By correlating the received signal with the coded symbols used at the transmitter, the data payload with forward error correction is received. However, the signal received by a single digital processing subsystem 250 may have relatively low signal to noise ratio (SNR) because the output of its correlator 252 represents only one of the received versions of the transmitted signal. The output of the correlator 252 is delay adjusted, e.g., by a delay equalizer 256, and combined with the outputs of others of the digital processing subsystems 250 by a combiner 272. Because each of the digital processing subsystems 250 processes a received signal representing a single multipath version of the transmitted signal, the SNR of each digital processing subsystem 250 may be relatively low, but when time aligned (by each delay equalizer 256) and combined (by the combiner 272) the combined signal at the output 280 may have a significantly higher SNR than any one of the digital processing subsystems 250 individually. In the example of a receiver 200b of FIG. 2B, each digital processing subsystem 250 has an associated optical resonator 230. Each of these optical resonators 230 may be intended to receive a separate multipath version of the transmitted optical signal. Accordingly, each of the optical resonators 230 may be physically oriented to respond to light coming from different directions, e.g., positioned to point in different directions. Alternatively, any of the optical resonators 230 may be manufactured to have varying dimensions so that the proper wavelength of light will resonate in the optical resonator 230 when it arrives at a particular angle, or a particular range of angles, and thereby responds to light in varying directions. Additionally, the set of optical resonators 230 may form an array and/or may be affixed to various surfaces and/or shapes and, again, thereby respond to light arriving from varying directions through multipath.

Additionally, a single optical resonator 230 may provide a signal to multiple digital processing subsystems 250, or to all the digital processing subsystems 250. Accordingly, a receiver in accord with aspects and examples herein may have only a single optical resonator 230 to receive multipath versions of the transmitted optical signal. For example, optics such as lenses and mirrors may be included in an optical front end to concentrate, collimate, or otherwise gather or "focus" optical signal light from multiple directions to arrive at a single optical resonator 230 or multiple optical resonators 230. The optical signal 232 emerging from such an optical resonator 230 may then include a combination of the multipath versions of the transmitted signal. Further, light may be gathered by optics and conveyed into an optical fiber to be delivered to one or more optical resonators 230. The medium through which the optical signal arrives may be any medium in accord with the environment of the communications taking place, such as vacuum of outer space, an atmospheric, air, or other gaseous medium, underwater or other liquid or fluid medium, or solid mediums capable of conveying the optical signal. Accordingly, an optical rake receiver may be advantageously adapted to accommodate any free-space optical communication, fiber optic communication, underwater communication, and the like. In all such cases described above with respect to optical resonators 230 (in number, orientation, or medium through which an optical signal is received by the resonators), operation of the digital processing subsystems 250 (optionally including a matched filter 260) continues as discussed above to individually receive various multipath versions of the transmitted signal, and to provide a time-aligned combined signal at the output 280 with higher SNR than might otherwise be achieved.

In various examples, a receiver in accord with aspects and examples disclosed herein may include additional or fewer optics than discussed above and may omit or add various components relative to those discussed above. For example, focusing optics may be included to receive the emerging optical signal 232 from an optical resonator 230 and to focus the optical signal 232 on the OEC 242. Certain examples may use analog receiver circuitry and therefore may omit one or more of the ADCs 244. Various examples may include a channel estimator as part of one or more of the digital processing subsystems 250 and provide phase rotation or other signal adjustments as may be known in the art.

Figure 3:
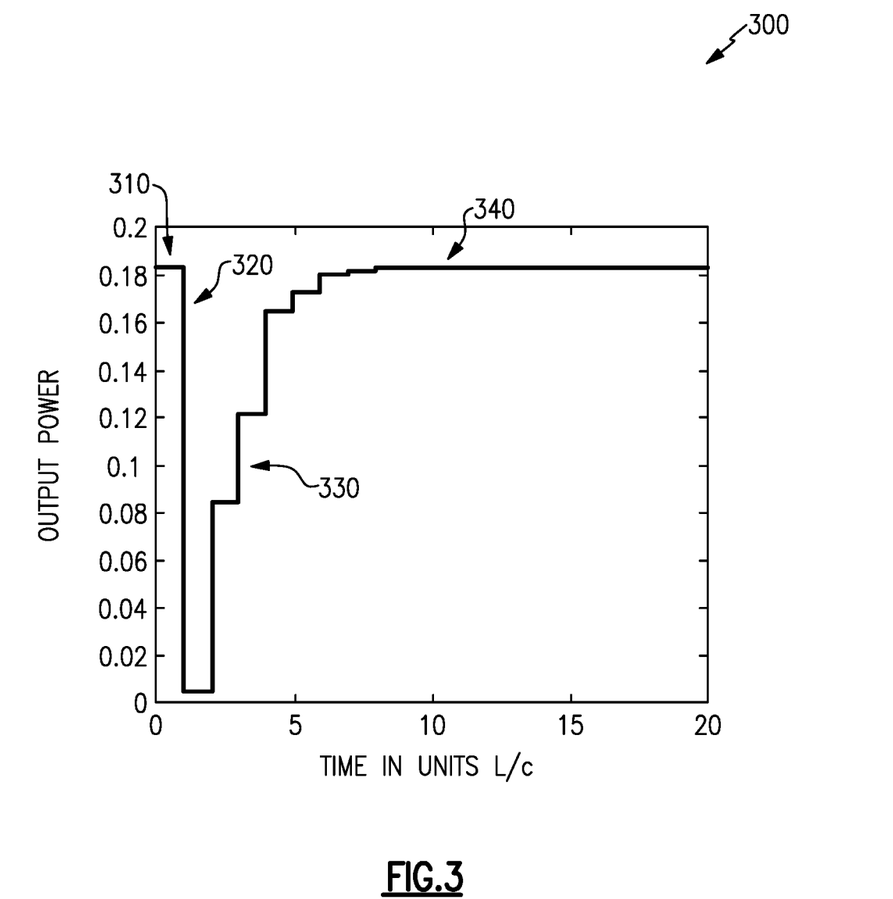
FIG. 3 is a graph of optical output intensity from an example of an optical resonator.

FIG. 3 further illustrates operation of an example of an optical resonator 230. FIG. 3 shows a graph 300 of optical signal intensity (as output power) emerging from an optical resonator, such as a Fabry-Perot etalon, during a phase transition in the received optical signal. At point 310 the etalon is in a steady-state resonance condition wherein a steady intensity of light emerges. At point 320 a phase transition occurs in the arriving optical signal, temporarily disrupting the steady-state and causing a drop in the emerging light intensity. During successive reflections inside the etalon, labeled at point 330, resonance is re-establishing and the emerging light intensity increases until, at point 340, a steady intensity of light emerges when the etalon has returned to a steady-state condition.

Variation in emerging light intensity from an optical resonator, such as an etalon or micro-ring, indicates that a transition occurred in an arriving optical signal, such as a phase, frequency, or amplitude variation, e.g., due to modulation of the optical signal from a transmitter. In the example discussed above and illustrated by FIG. 3, the arriving optical signal is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an optical resonator tuned to the arriving wavelength reacts to a phase change in the arriving optical signal in accord with the discussion above and as illustrated in FIG. 3. If the arriving optical signal is modulated with binary phase shift keying (BPSK), for example, the output illustrated in FIG. 3 indicates each phase shift and accordingly the information carried in the phase shift keying is recovered. It should be understood by those of skill in the art with the benefit of this disclosure, that such information recovery is achieved without the necessity for a local coherent clock source to detect phase changes and demodulate the arriving optical signal.

Figure 4A:
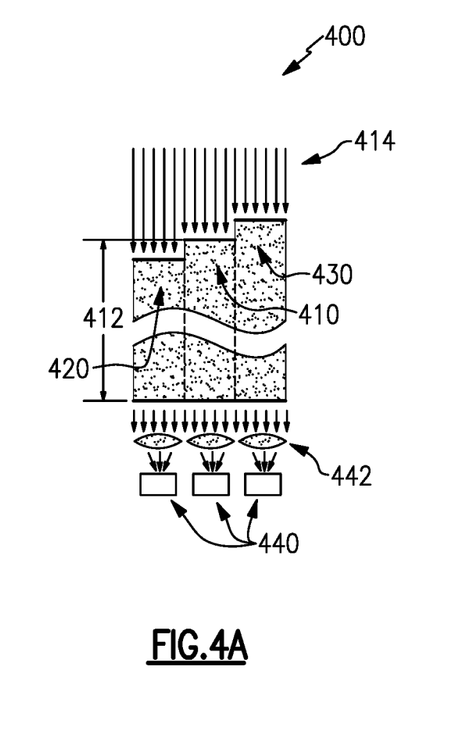
FIG. 4A is a schematic diagram of an example of an optical resonator capable of demodulating optical signals for use as part of the optical rake receiver of FIG. 2B.

FIG. 4A illustrates another example of an optical resonator. The optical resonator 400 of FIG. 4A is capable of demodulating optical signals modulated with higher order modulation, such as but not limited to quadrature phase shift keying (QPSK), for example. In QPSK, phase transitions of the arriving optical signal are between four different phases of 0, 90, 180, and 270 degrees, or 0, 90, 180, and −90 degrees, for example. The response of an etalon as discussed above, with reference to FIG. 3, to a 180 degree phase shift is larger than for a 90 degree phase shift, because the more significant change of 180 degrees interferes more strongly with the resonance in the etalon, and takes longer to re-establish steady-state, than does a phase change of only 90 degrees. Accordingly, a 180 degree phase change causes a drop in output signal as shown in FIG. 3 that is greater than for a 90 degree phase change. An etalon tuned to the wavelength of the arriving optical signal may produce the same temporary drop in output signal intensity as shown in FIG. 3 for a positive 90 degree phase shift as for a negative 90 degree phase shift, making the two indistinguishable. The optical resonator 400 of FIG. 4A, however, provides the capability of distinguishing such higher order modulations.

The optical resonator 400 includes a tuned etalon 410 that is configured with a thickness 412 to be resonant at the wavelength of the arriving optical signal 414. One or more additional etalons are tuned to be slightly above the resonance point and/or below the resonance point. For example, the optical resonator 400 includes two additional etalons 420, 430 tuned above and below the resonance point, i.e., of slightly larger and slightly smaller dimensions, the variation in dimension between the three etalons 410, 420, 430 being significantly less than a wavelength. The optical resonator 400 further includes a set of EOCs 440, one for each etalon, to convert the output signal from each etalon into an electrical signal, and optionally includes focusing optics 442.

The tuned etalon 410 converts the phase-modulated optical signal to a representative intensity, as discussed above with reference to FIG. 3. Each detuned etalon, e.g., etalon 420, 430, may provide plus and minus phase information for determining the direction of phase change. By comparing the various outputs, a controller or processor can determine whether a phase shift is an increase or a decrease in phase, thus supporting higher order phase modulation than the BPSK case. Additionally, changes in the intensity of the arriving optical signal may be detected because such changes will also appear at the output of at least the tuned etalon 410, thus supporting further higher order modulations such as quadrature amplitude modulation (QAM) orders, e.g., 16-QAM, 32-QAM, and so on. Still further, the optical resonator 400 may be used to demodulate frequency (or wavelength) modulation because any of the etalons 410, 420, 430 may respond in greater or lesser resonance to differing wavelengths of the arriving optical signal 414, thereby allowing interpretation of their outputs to detect the frequency (or wavelength) changes of the optical signal 414.

Figure 4B:
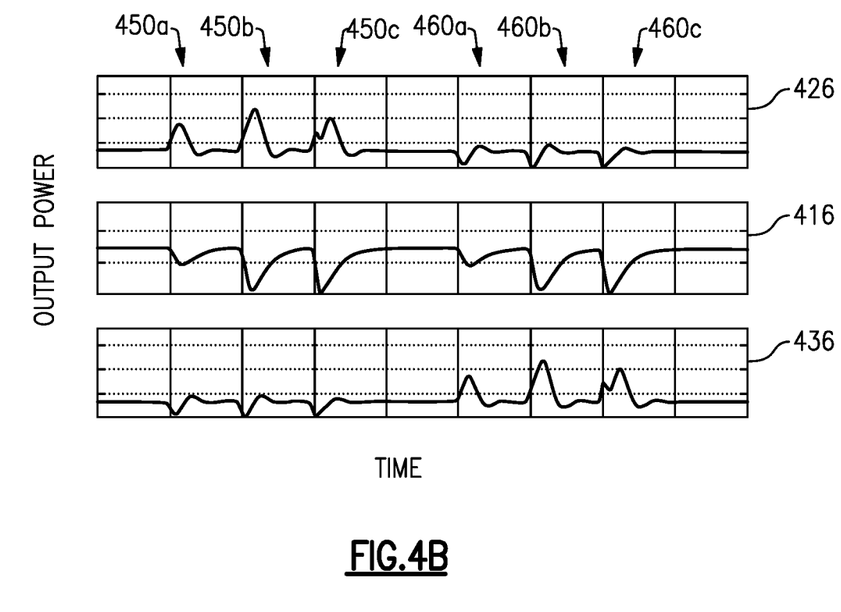
FIG. 4B is a set of graphs of an example of optical output intensity from the optical resonator of FIG. 4A.

Examples of the outputs of the etalons 410, 420, 430 are shown in graphical form in FIG. 4B. The graph 416 illustrates an output of the tuned etalon 410. Graphs 426, 436 illustrate outputs of the detuned etalons 420, 430, respectively. It can be seen by the peaks and troughs in the graphs 416, 426, 436 that the direction of phase change occurring at times 450 is the opposite of that at times 460. Particularly, such is shown in graph 426 for the etalon 420 by the peaks at times 450 versus troughs at times 460. Likewise, the graph 436 for the etalon 430 (detuned in the opposite direction as etalon 420) shows troughs at the times 450 and peaks at the times 460. Additionally, the magnitude of phase change (in the arriving optical signal 414) at time 450a is lesser than the magnitude at time 450b, 450c, as can be seen by the differing magnitude of the troughs in the graph 416 for the tuned etalon 410 and also by the differing magnitude of the peaks in the graph 426 for the detuned etalon 420. It should be understood, with the benefit of this disclosure, that for certain modulation schemes a single detuned etalon, such as etalon 420 or etalon 430, may be sufficient to distinguish the direction and magnitude of phase changes when combined with analysis of the output of the tuned etalon 410. Similarly, it should also be understood with the benefit of this disclosure, that additional detuned etalons may be included in certain examples to support ever higher modulation orders of frequency, amplitude, and phase.

While the optical resonator 400 of FIG. 4 is shown as a set of etalons, certain examples may include micro-ring or other resonator structures. The use of tuned and detuned resonators may be advantageously applied to demodulate or recover phase from the various modulation characteristics of an arriving optical signal in in accord with aspects and examples disclosed herein.

Additionally, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, such optically resonating structures may be formed as a laminate, layer, film, coating, or the like.

Various examples of optical receivers in accord with those described herein may include components to separate received signals into quadrature components, such as by separation of an optical signal into orthogonally polarized portions and/or separation of an underlying signal into in-phase and quadrature (e.g., I/Q) components, as known in the art.

As discussed above with reference to FIGS. 1 and 2, in various examples, components of the transmitter 100 and/or receiver 200 may be implemented as one of, or a combination of, analog circuitry, digital circuitry, or one or more microprocessors executing software instructions. In particular, software instructions may include digital signal processing (DSP) instructions.

Figure 5:
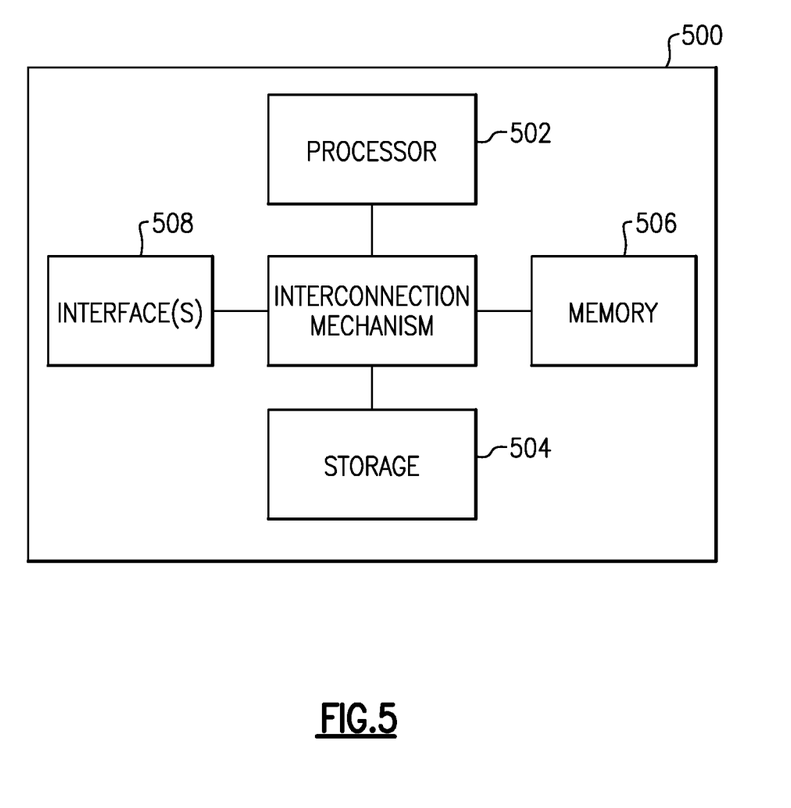
FIG. 5 is a functional block diagram of an example of a controller configured to implement various examples of the processes described herein.

FIG. 5 illustrates one example of a control circuit (e.g., a controller 500) that may implement software routines corresponding to the FEC module 104, the encoding module 106, the mapping module 108, as illustrated in FIG. 1, and/or other components. The controller 500 may further implement software routines corresponding to the correlators 252 and/or the code generators 254 associated with each digital processing subsystem 250 of FIG. 2, the matched filter 260 and/or the combiner 272 of FIG. 2, and/or other components. The controller 500 may include a processor 502, a data store 504, a memory 506, and one or more interfaces 508, such as a system interface and/or a user interface. While not explicitly illustrated in FIG. 5, in certain examples the controller 500 may be coupled to a power source. The power source may deliver power to one or more components of the controller 500, as well as other components of the optical transmitter 100 or optical receiver 200.

In FIG. 5, the processor 502 is coupled to the data storage 504, memory 506, and the various interfaces 508. The memory 506 stores programs (e.g., sequences of instructions coded to be executable by the processor 502) and data during operation of the controller 500. Thus, the memory 506 may be a relatively high performance, volatile, random access memory such as a dynamic random access memory ("DRAM") or static memory ("SRAM"). However, the memory 506 may include any device for storing data, such as a disk drive or other nonvolatile storage device. Various examples may organize the memory 506 into particularized and, in some cases, unique structures to perform the functions disclosed herein. These data structures may be sized and organized to store values for particular data and types of data.

The data storage 504 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 502 to perform any of the functions described herein.

In various examples, the controller 500 includes several interface components 508, such as a system interface and/or a user interface. Each of the interface components 508 is configured to exchange, e.g., send or receive, data with other components of the controller 500 (and/or associated transmitter or receiver), or other devices in communication with the controller 500. According to various examples, the interface components 508 may include hardware components, software components, or a combination of hardware and software components.

In certain examples, components of the system interface couples the processor 502 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the controller 500 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the controller 500. Data received at the various interfaces may be provided to the processor 502, as illustrated in FIG. 5. Communication coupling (e.g., shown interconnection mechanism 510) between the processor 502, memory 506, data storage 504, and interface(s) 508 may be implemented as one or more physical busses in conformance with specialized or standard computing bus technologies.

The processor 502 performs a series of instructions that result in manipulated data that is stored in and retrieved from the data storage 504, as discussed above. In various examples, the series of instructions result in interpretation of the outputs from optical resonators as discussed above. Such instructions may correspond to commands for interpreting peaks and troughs of such output signals to determine phase, amplitude, and frequency changes (modulations) in an arriving optical signal, and/or recovering a data payload therefrom, as discussed herein.

The processor 502 may be any type of processor, multiprocessor or controller, whether commercially available or specially manufactured. For instance, the processor may include a commercially available processor, such as a processor manufactured by INTEL, AMD, MOTOROLA, or FREESCALE. In some examples, the processor 502 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. An optical communication method, the method comprising:
   receiving an optical signal by an optical resonator to provide an intensity modulated signal indicative of a modulation of the optical signal;
   providing the intensity modulated signal to a selected channel receiver of a plurality of channel receivers;
   recovering, by the selected channel receiver, from the intensity modulated signal, a multipath version of a transmitted signal embedded in the modulation of the optical signal, to provide a recovered signal; and
   combining the recovered signal with an output of at least one other of the plurality of channel receivers to provide a combined output signal.

2. The method of claim 1 further comprising:
   providing the intensity modulated signal to a second channel receiver of the plurality of channel receivers;
   recovering, by the second channel receiver, from the intensity modulated signal, a second multipath version of the transmitted signal to provide a second recovered signal; and
   combining the recovered signal from the selected channel receiver with the second recovered signal to provide the combined output signal.

3. The method of claim 1 further comprising:
   receiving a second optical signal by a second optical resonator to provide a second intensity modulated signal indicative of a modulation of the second optical signal;
   providing the second intensity modulated signal to a second channel receiver of the plurality of channel receivers;
   recovering, by the second channel receiver, from the second intensity modulated signal, a second multipath version of the transmitted signal to provide a second recovered signal; and
   combining the recovered signal from the selected channel receiver with the second recovered signal to provide the combined output signal.

4. The method of claim 1 further comprising receiving the optical signal by a second optical resonator to provide a second intensity modulated signal indicative of a direction of a phase shift in the optical signal, and providing the second intensity modulated signal to the selected channel receiver.

5. The method of claim 1 further comprising providing the intensity modulated signal to a filter and determining, by the filter, an appropriate time delay for recovering the multipath version of the transmitted signal.

6. The method of claim 5 further comprising controlling the selected channel receiver to apply the appropriate time delay.

7. The method of claim 1 wherein receiving an optical signal by an optical resonator includes receiving the optical signal by one of an etalon, a resonant cavity, an interferometer, and a micro-ring.

8. An optical receiver comprising:
   at least one optical resonator configured to receive an optical signal and to provide an intensity modulated signal indicative of a modulation of the optical signal;
   a plurality of channel receivers, each of the plurality of channel receivers configured to recover, from an input signal, a multipath version of a transmitted signal embedded in the modulation of the optical signal, at least one of the plurality of channel receivers configured to receive the intensity modulated signal as its input signal and to provide a recovered output signal; and
   a combiner configured to combine the recovered output signal with at least one other output signal from at least one other of the plurality of channel receivers to provide a combined output signal.

9. The receiver of claim 8 wherein a second of the plurality of channel receivers is configured to receive the intensity modulated signal, to recover a different multipath version of the transmitted signal, and to provide the at least one other output signal.

10. The receiver of claim 8 further comprising a second optical resonator to receive a second optical signal and to provide a second intensity modulated signal indicative of a modulation of the second optical signal, the second intensity modulated signal provided as an input signal to a second channel receiver of the plurality of channel receivers.

11. The receiver of claim 10 wherein the second channel receiver is configured to receive the second intensity modulated signal, to recover from the second intensity modulated signal a different multipath version of the transmitted signal, and to provide the at least one other output signal.

12. The receiver of claim 8 further comprising a second optical receiver configured to receive the optical signal and provide a second intensity modulated signal indicative of a direction of a phase shift in the optical signal, and to provide the second intensity modulated signal to the selected channel receiver.

13. The receiver of claim 12 wherein the selected channel receiver is configured to interpret the second intensity modulated signal to recover the multipath version of the transmitted signal.

14. The receiver of claim 8 further comprising a filter to receive the intensity modulated signal and configured to determine an appropriate time delay for recovering the multipath version of the transmitted signal.

15. The receiver of claim 14 further comprising a controller configured to control the selected channel receiver to apply the appropriate time delay.

16. The receiver of claim 8 wherein the at least one optical resonator is one of an etalon, a resonant cavity, an interferometer, and a micro-ring.

17. An optical receiver comprising:
means for converting a received optical signal into an intensity modulated signal indicative of a modulation of the optical signal; and
a signal processor having a plurality of channels, at least one of the plurality of channels configured to recover from the intensity modulated signal a multipath version of a transmitted signal embedded in the optical signal, and the signal processor configured to combine the outputs of two or more of the plurality of channels to provide a combined output signal.

18. The receiver of claim 17 wherein the means for converting the received optical signal includes one of an etalon, a resonant cavity, an interferometer, and a micro-ring.

19. The receiver of claim 17 wherein the at least one of the plurality of channels is configured to correlate the intensity modulated signal to a time delayed version of a transmitted code embedded in the multipath version of the transmitted signal.

20. The receiver of claim 17 further comprising means for converting the received optical signal into a second intensity modulated signal indicative of a direction of a phase shift in the optical signal, and at least one of the plurality of channels is configured to interpret the second intensity modulated signal to recover the multipath version of the transmitted signal.

* * * * *